US007524442B2

(12) United States Patent
Adiga

(10) Patent No.: US 7,524,442 B2
(45) Date of Patent: Apr. 28, 2009

(54) METHOD AND DEVICE FOR MANUFACTURING EXTREMELY FINE PARTICLES AND POROUS MATERIALS BY CONTROLLED LOW TEMPERATURE DRYING

(75) Inventor: Kayyani C. Adiga, Macon, GA (US)

(73) Assignee: Nanomist Systems, LLC, Macon, GA (US)

( * ) Notice: Subject to any disclaimer, the term of this patent is extended or adjusted under 35 U.S.C. 154(b) by 637 days.

(21) Appl. No.: 11/306,767

(22) Filed: Jan. 10, 2006

(65) Prior Publication Data

US 2009/0044421 A1 Feb. 19, 2009

(51) Int. Cl.
*B29B 9/00* (2006.01)

(52) U.S. Cl. ........................................ 264/14; 159/48.1

(58) Field of Classification Search ........................ None
See application file for complete search history.

(56) References Cited

U.S. PATENT DOCUMENTS

2005/0031692 A1* 2/2005 Beyerinck et al. ........... 424/486

OTHER PUBLICATIONS

Monse, K. and Walzel, P., "Comparison of Spray Dried Particles Formed from Superheated and Non-Superheated Suspensions" 4th European Congress of Chemical Engineering, Granada, Sep. 21-25, 2003. Granada.

Iskandar, F., Gradon, L. and Okuyama, K. "Control of the morphology of nanostructured particles prepared by the spray drying of a nanoparticle sol." J Colloid Interface Sci. Sep. 15, 2003;265(2):296-303. US.

Tsapis, Nicolas "Mechanism of formation of Large Porous Particles containing nanoparticles," Web: http://www.umr-cnrs8612.u-psud.fr/tsapis/perso/AIR.html (Date of web publication prior to Dec. 30, 2004). France.

Tsapis, Nicolas "Mechanical instabilities in evaporating colloidal drops." Web: http://www.umr-cnrs8612.u-psud.fr/tsapis/perso/droplets.html (Date of web publication prior to Dec. 30, 2004). France.

Martinello, M. A., Maltea, M. A., and Crapiste, G. "Superheated steam drying of parsley: A fixed bed model for predicting drying performance" Latin American Applied Research, 33:333-337 (2003). Argentina.

* cited by examiner

*Primary Examiner*—Mary Lynn F Theisen
(74) *Attorney, Agent, or Firm*—Brian D. Bellamy

(57) ABSTRACT

A method and device for manufacturing extremely fine particles and porous materials by controlled low temperature drying. An ambient-pressure and ambient-temperature atomizer atomizes a particle precursor solution to create a precursor mist. The precursor mist and dryer gas are fed into a dryer tube through a tangential inlet (swirl generating inlet). The mixed stream forms a helical flow structure within the dryer tube. The swirling mist undergoes drying and particle formation at a relatively low temperature. The flow continues to swirl and drying process continues with repeated passes until the required drying duration is reached. This dryer structure allows for a compact dryer with full control of residence time.

1 Claim, 5 Drawing Sheets

METHOD AND DEVICE FOR MANUFACTURING EXTREMELY FINE PARTICLES AND POROUS MATERIALS BY CONTROLLED LOW TEMPERATURE DRYING

FIELD OF THE INVENTION

This invention relates to low temperature synthesis and manufacturing of nano (or extremely fine) particles using controlled temperature and residence time for uniform drying of heat sensitive materials such as food, pharmaceuticals, propellants, explosives and other chemicals. More specifically, the invention relates to controlling the temperature and residence time within a helical flow reactor where premixed drying gas and precursor mist swirling flow combined with repeated passes will provide relatively high residence time to produce nano-sized particles and nanoporous particles after leaching and post-processing.

BACKGROUND OF THE INVENTION

The large scale synthesis, characterization, and processing of nanostructured materials are part of an emerging and rapidly expanding field of nanotechnology.

Nano and micron sized heat sensitive materials can be manufactured in large quantities by dissolving precursor (in-feed large particles) in a suitable solvent and spray-drying them in a carefully controlled environment. However, particle temperature during drying should not exceed the critical temperature for specific materials above which particles may degrade, burn or explode. Therefore, keeping a relatively low drying temperature is very crucial. However, the low temperature requires a longer residence time for suitable drying to take place and hence unusually long dryer length (or height). Furthermore, the drying gas, the local temperature and residence time have a decisive role in the resultant particle morphology. Depending on heat and mass transfer conditions, dried particle shapes will vary. For example, super heated steam drying can produce more porous materials as compared to hot gas because of the associated high vaporization rate. Industrial drying encompasses a host of drying methods including drum drying, pneumatic dryers, direct and indirect heated dryers, steam dryers, microwave dryers and pulse heat dryers.

Spray drying is a unique drying process since it involves both particle formation and drying. The characteristics of the resultant powder can be controlled, and powder properties can be maintained constant throughout a continuous operation. With the designs of spray dryers available, it is possible to select a dryer layout to produce either fine- or coarse-particle powders, agglomerates or granulates.

Spray drying involves the atomization of feed into a spray, and contact between spray and drying medium resulting in moisture evaporation. The drying of the spray continues until the desired moisture content in the dried particles is achieved, and the product is recovered from the air.

In order to produce "tailored" particle size and morphology, the prior art uses spray drying in horizontal or vertical dryers. Typically, hot drying gas moves upwards while the precursor spray travels down. The hot gas is often swirled.

There are several problems with prior art spray drying that persist. For instance, a need exists for shorter length dryers for low temperature drying in methods where the in-feed precursor solution is atomized and sprayed into the drying chamber. Typically, the drying gas flows either co-current or counter-current. In co-current situations, the spray and drying gas mix downstream inside the chamber. In the prior process technology the dryer length is excessive for low drying-gas temperatures, often exceeding 30-50 meters depending on the dryer gas temperature and solid loading. Therefore, a technology is needed for effective drying that allows the dryer length to remain reasonably short (1-5 meters) for low temperature and high solid loading processes.

Additionally, the mixing efficiency of the spray and drying gas is an important factor in heat transfer and drying rate. An efficient mixing of the spray and gas is required to promote a high heat transfer rate, as well as uniform drying.

Thus, there is a challenge for low temperature drying, such as drying at temperatures less than 100° C. Because of a lack of efficient mixing of spray and drying gases and low drying rates, the required dryer length is presently required to be very long relative to desired usage of space. This is a great manufacturing concern for modern nano and micron particle production of heat sensitive materials such as pharmaceuticals, propellant ingredients, explosives, and high-energy solids.

Another challenge presented by low temperature drying is control of residence time of the spray. Spray momentum may flow downward counter to the upward drying gas flow. The residence time of the spray and thus the particles is a complex function of upward drying gas flow, swirl, and spray momentum.

Finally, there is presently a lack of process technology for low temperature production of nanomaterials using ultra high humidity drying (UHHD), and there are no dryer process technology guidelines for drying heat sensitive materials using UHHD.

SUMMARY OF THE INVENTION

The present invention provides a premixed stream that swirls through the reactor with a high residence time. The premixed stream comprises an extremely low momentum ultrasonically produced spray and drying medium gas such as air, inert gas or steam. Because of the premixed nature of the spray and drying gas, heat transfer and hence drying rate is extremely high. The residence time can be varied by swirl inlet velocity and path length controlled by swirl number and dryer diameter.

The drying gas includes, but is not restricted to, air, inert gas (nitrogen, He) and super heated steam depending on the drying requirements. The drying requirements may be determined by characteristics desired product of the material, such as the chemical nature and stability of the material and the desired morphology. Because of the swirling flow and intimate mixing of spray mist and drying gas, the present invention provides a relatively short dryer length for low temperature drying.

The steam drying choice of the present invention provides advantages such as:

(1) no flue gas or air to oxidize or contaminate the material, particularly important for pharmaceuticals, (2) a controlled temperature and residence time, particularly useful for heat sensitive products such as explosives, (3) constant drying period, which is usually very short for air drying process will stretch in steam drying and will ensure constant particle temperature (<212 F) during most of drying, and (4) different morphologies of dried particles may be produced depending on drying conditions such as temperature, velocity and solid loading.

A primary objective of this invention is to provide a method and device for low temperature uniform drying of heat sensitive materials such as pharmaceuticals, propellants, explosives, food materials and other chemicals.

It is another objective to provide a high rate of drying through enhanced heat transfer rates achieved by premixing the pre-cursor spray and the drying gas medium.

It is another objective to provide a high residence time and short dryer length by swirling the stream inside the dryer tube.

It is another objective to provide repeated flow inside an outer tube using concentric drying tubes to repeat the swirling flow process. This design makes the dryer several times shorter for a given dryer gas temperature.

It is another objective to fully control the residence time by varying the swirl number, or the number of times the mixture will swirl and circulate within the chamber.

Yet another objective is to vary the configuration of swirl vanes or swirl inlet geometry to vary and control the swirl number.

It is another objective to vary the morphology of particles by augmenting heat transfer rates of droplets by means of an accelerated swirl flow of the mixed stream of spray and drying gas.

It is another objective to achieve superior mixing of extremely low momentum (ambient-pressure) ultrasonic atomization precursor mist and the drying gas. This is not feasible using high pressure, streaming high velocity jet sprays.

It is another objective to control the final droplet diameter through solid concentration in the atomized droplets. For example, if the monodisperse droplet diameter is 1 micron, and the solution contained dissolved 10% wt of solid, the dried particles will be 100 nm.

It is another objective to use inert gas as drying medium to prevent particle from chemical interaction with the drying medium.

It is another objective to use aqueous, non-aqueous, mixed solvents and micro-structured fluids (micro-emulsions) to prepare precursor solids for atomization.

It is yet another objective to provide a method of producing nano-porous materials by adding an additive while forming nano-particles. The additive is post-processed to remove the additive from the particles. The resultant structure provides nano-porous material, or nano-particles with nano-porous structure.

Thus, this invention provides a premixed, swirling flow stream of precursor material and drying gas inside a drying tube. The precursor flow is helical within the reactor with a variable residence time. The energy for drying and generating particles in the swirling flow of precursor mist comes from the drying gas. Since the solvent to be dried is free water, the drying will terminate at the end of a constant rate period. This will avoid any over-heating of material after the removal of free water.

These and other objective of the invention will be further described by the following description, and the scope and content of the invention will be defined by the claims.

DETAILED DESCRIPTION

The invention achieves excellent drying process parameter control by an intimate mixture of low velocity ambient-pressure precursor mist of spray and drying gas. The precursor mist is dried in an accelerated swirl flow inside a dryer tube. The precursor mist may be used for encapsulation agent delivery or coating agent dispersion. The process provides a helical dryer-reactor that is compressed in length as compared with other dryer-reactors that do not employ the helical methodology and related steps. The present helical dryer-reactor provides wider flexibility with respect to residence time and temperature control, and the reactor allows for compressing the reactor length by folding the reactant stream and adjusting the residence time. Advantages of reactor are achieved by swirling the stream within a reactor tube while increasing the residence time in a low temperature region, rather than providing a quick pass along the heat source.

The morphology of dried particles depends on two different time scales. The first is the time required for a droplet to dry, and the second scale is the time required for a solute to diffuse. The ratio of these two characteristic times defines an effective Peclet number Pe, a dimensionless mass transport number that characterizes the relative importance of diffusion and convection. If drying of a droplet is sufficiently slow, $Pe<1$, the solutes within the droplet have adequate time to redistribute by diffusion throughout the evaporating droplet, yielding relatively dense dried particles. If the drying of the droplet is very quick, $Pe>1$, solutes of nano-particles have insufficient time to diffuse from the surface to the center of the droplet, and instead accumulate near the drying front of the droplet, and the evaporating front becomes a shell or crust.

Figure 1:
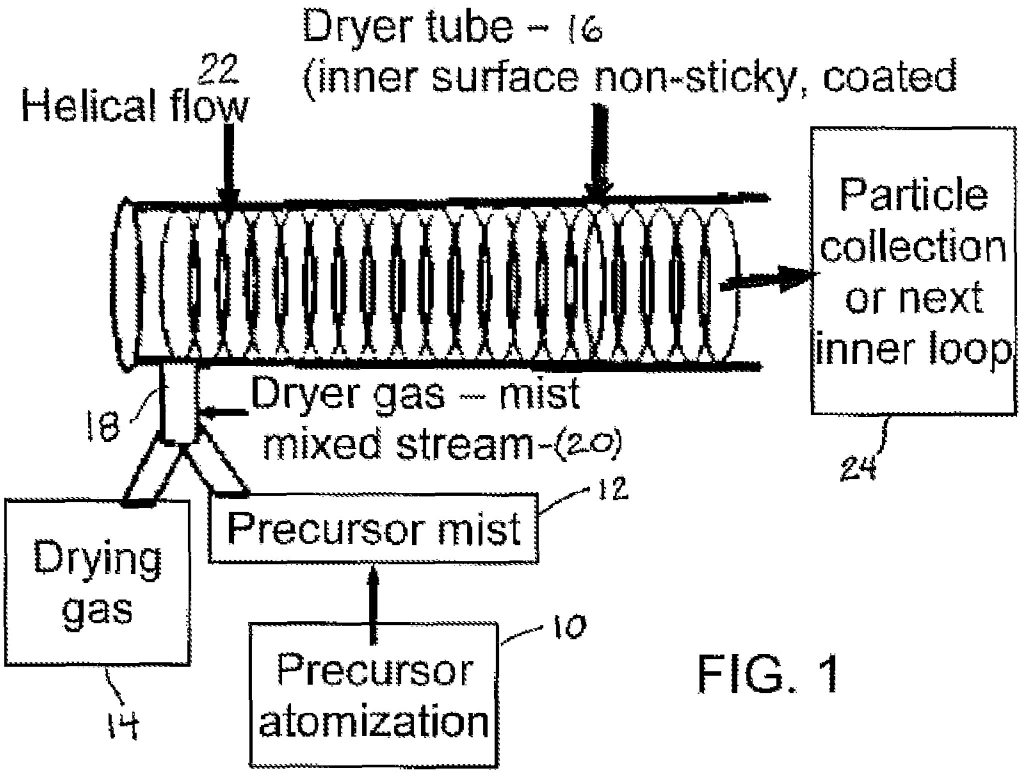
FIG. 1 shows a schematic view of a fine particle drying process using a helical flow dryer and precursor mist premixed with a drying gas in accordance with an embodiment of the invention.

FIG. 1 shows an exemplary process of the present invention in a schematic format. The particle precursor solution is atomized via the step of precursor atomization 10 into a fine mist 12 by an ambient-pressure and ambient-temperature atomizer. The fine mist of the atomized precursor solution and a dryer gas 14 are fed into the dryer tube 16 through one or more tangential-like inlets 18. The tangential inlet directs flow of the mixture linearly along a line theoretically touching but not intersecting the edge of a circle. The circle represents the cross-section of a swirling helical flow through a container or tube 16. Thus, via the tangential inlet swirling flow of mixed stream of mist and drying gas 20 is created. The mixed stream forms a helical flow structure 22 within the dryer tube as the flow continues through the tube as shown in FIG. 1. The final step of particle collection 24 removes the dried particles from the drying tube 16 via an outlet for use or further processing.

The swirling mist undergoes drying and particle formation at a relatively low temperature, preferably <120° C. The heat for elevating the drying temperature to the desired level is obtained from the drying gas.

Figure 2:
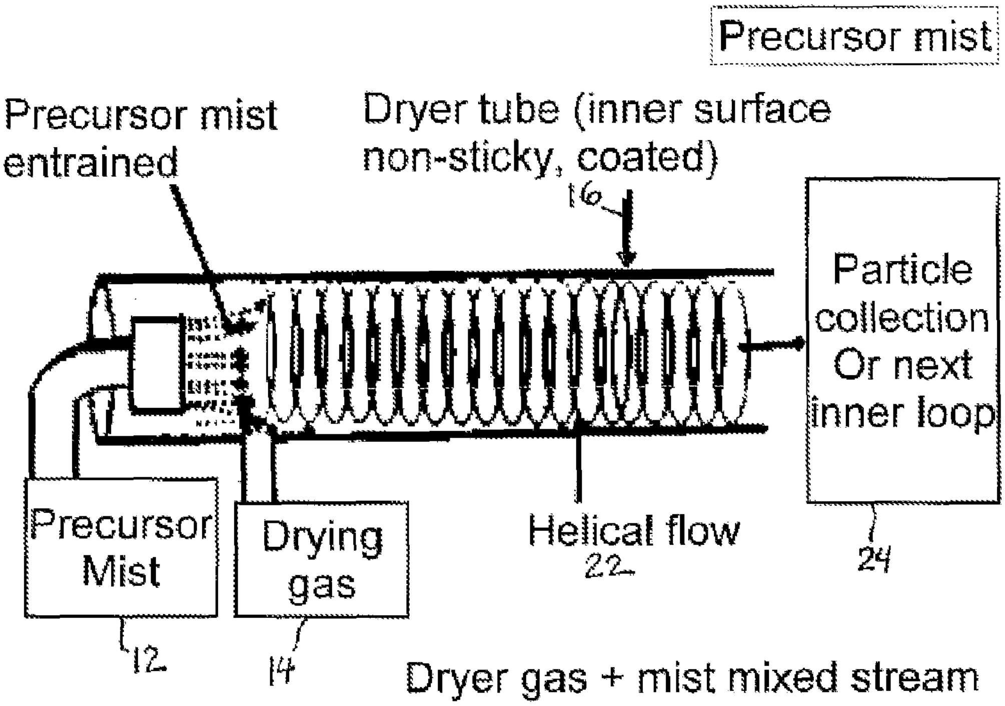
FIG. 2 shows a schematic view of a fine particle drying process using a helical flow dryer and precursor mist entrained by a drying gas in accordance with an embodiment of the invention.

Alternatively, the precursor mist 12 may be introduced upstream of the tangential or swirl inlet 18. This will avoid aerosol deposition and droplet loss due to plating and coalescence. FIG. 2 shows this alternate design of mist introduction. Because the mist is introduced into the dryer tube 16 with extremely low velocity, the mist will be entrained by the swirling and drying gas flow downstream. The atomized mist may be generated to behave like gas by atomizing the mist into nano-scale droplets of less than 10 micron diameter using ambient atomization technology that controls coalescence. The atomized mist is fed into the dryer as shown FIG. 1 or 2.

Figure 3:
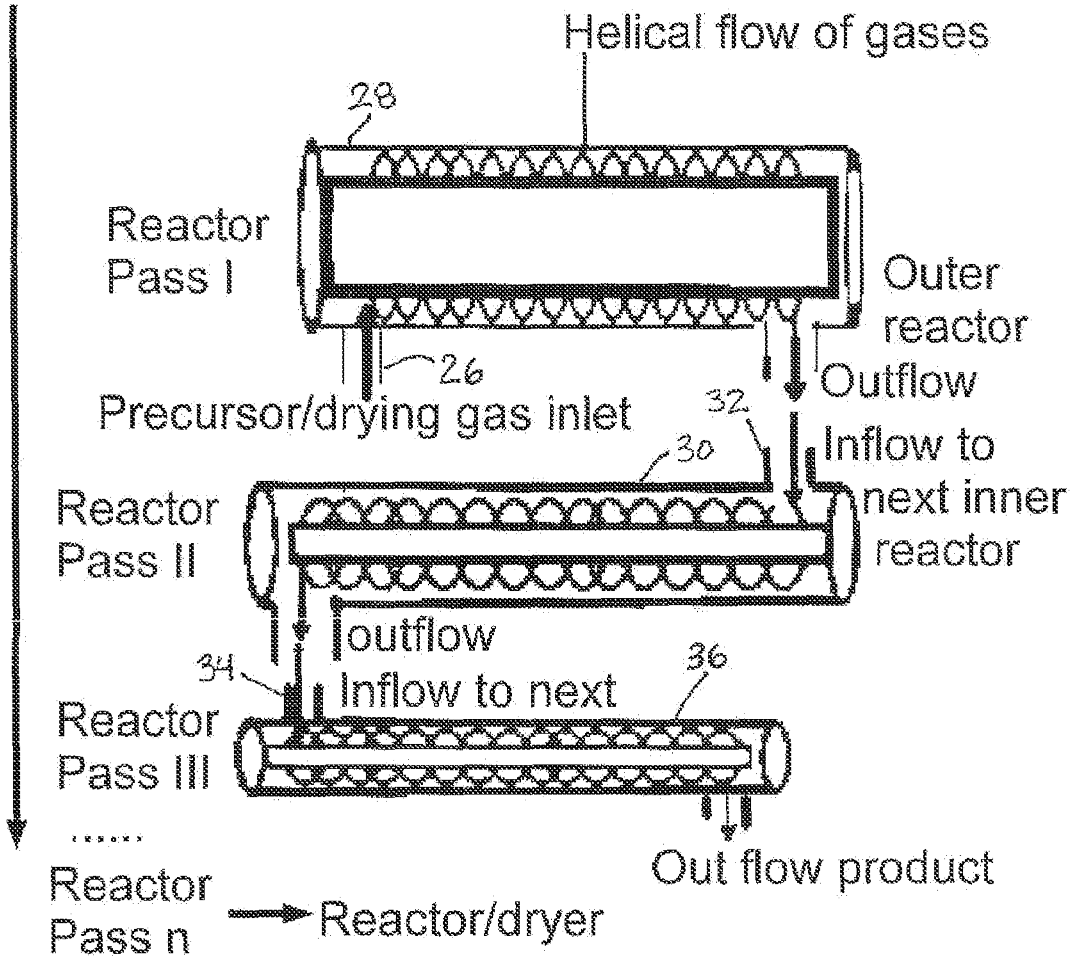
FIG. 3 shows a schematic view of a helical flow low temperature dryer constructed in accordance with the invention.

FIG. 3 shows the schematic of a folded helical low temperature dryer. A premixed dryer gas and precursor mist are fed into the dryer via tangential inlet 26 (swirl inlet). Alternatively, the precursor mist can be introduced directly upstream of tangential drying gas introduction as shown previously in FIG. 2. The outflow from outer tube 28 enters the inner tube 30 via tangential inlet 32. The flow continues to swirl and the drying process continues. These passes are repeated at inlet 34 and tube 36 until the required dryer length is reached. This "folded" dryer structure allows a compact dryer with full control of residence time.

Figure 4A:
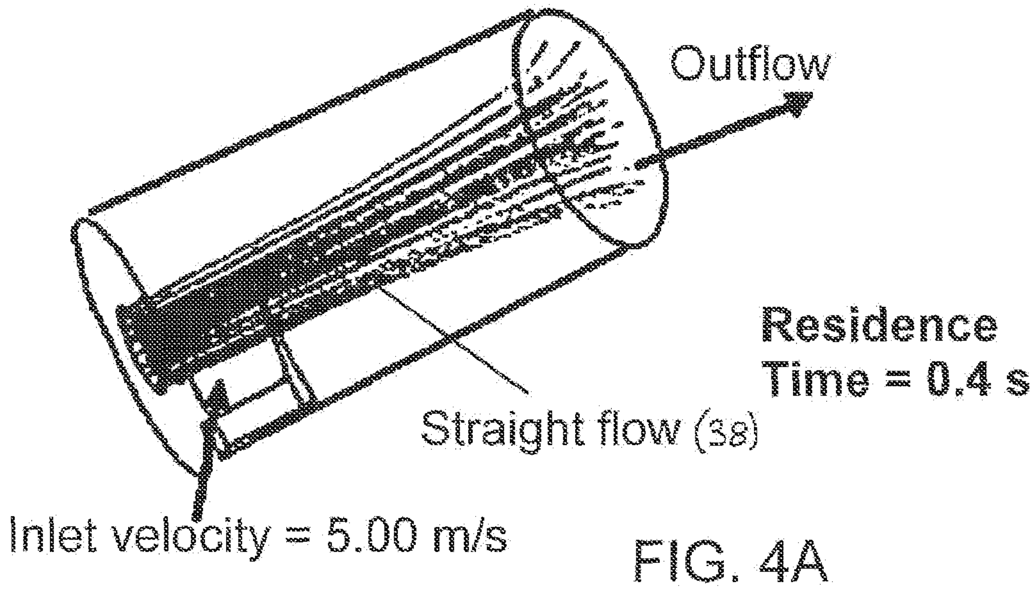
FIG. 4 shows a schematic view of precursor droplets paths inside a drying reactor: A) straight central flame flow and B) swirling mist flow.
Figure 4B:
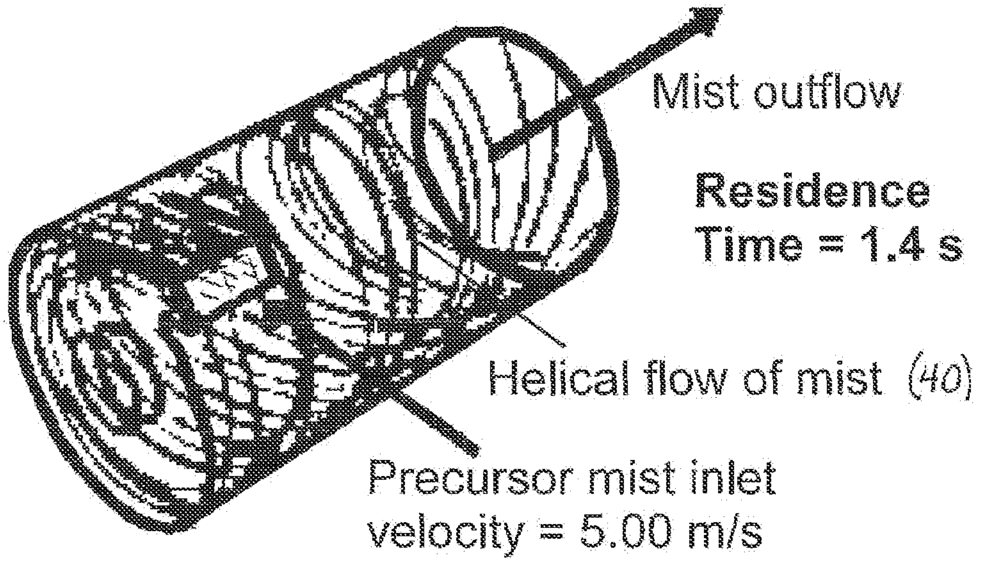

FIGS. 4A and 4B show an example of how residence time can be increased by swirl flow structure. FIGS. 4A and 4B compare straight central flow 38 and helical flow structures 40 for the same inlet flow rate of 5 m/s. For the straight flow scenario, the residence time was 0.4 second for monodisperse 1 micron particles. However, when mist droplets flow in a swirl pattern, (not along the flame), the residence time is 1.4 s. This increase can be magnified by varying the swirl number. The swirl number is the ratio of axial to angular momentum of flow. This is varied by the swirl vanes installed at the inlet or inlet geometry. Thus, the residence time of the precursor mist with the drying medium may be adjusted by varying swirl inlet vane angles, inlet geometry, inlet velocity, dryer diameter, and dryer length.

Figure 5:
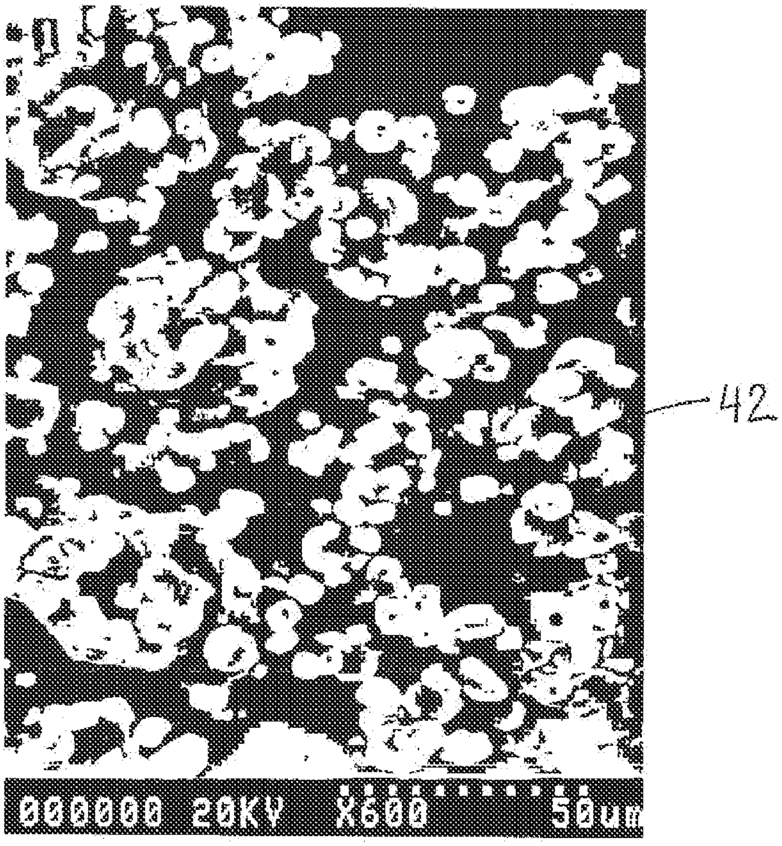
FIG. 5 shows a SEM image of a dried compound using an ultrasonic mist generator.
Figure 6:
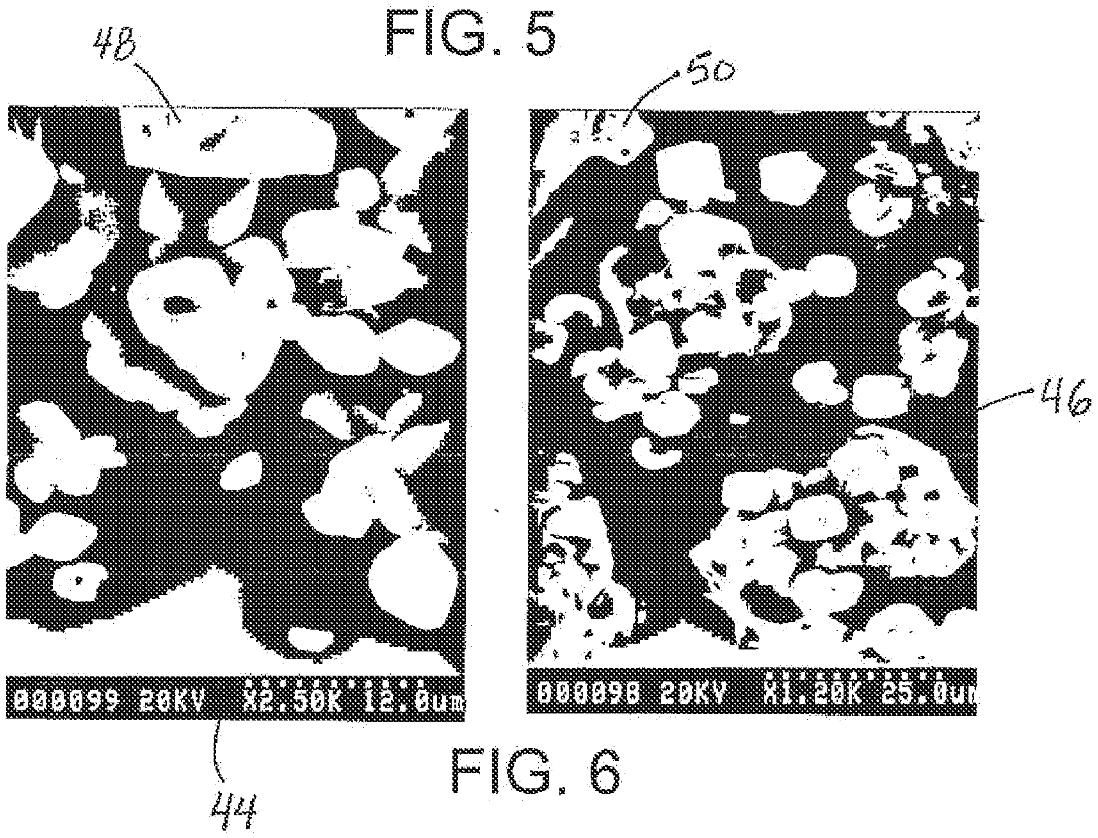
FIG. 6 shows a SEM Image of dried particles.
Figure 7:
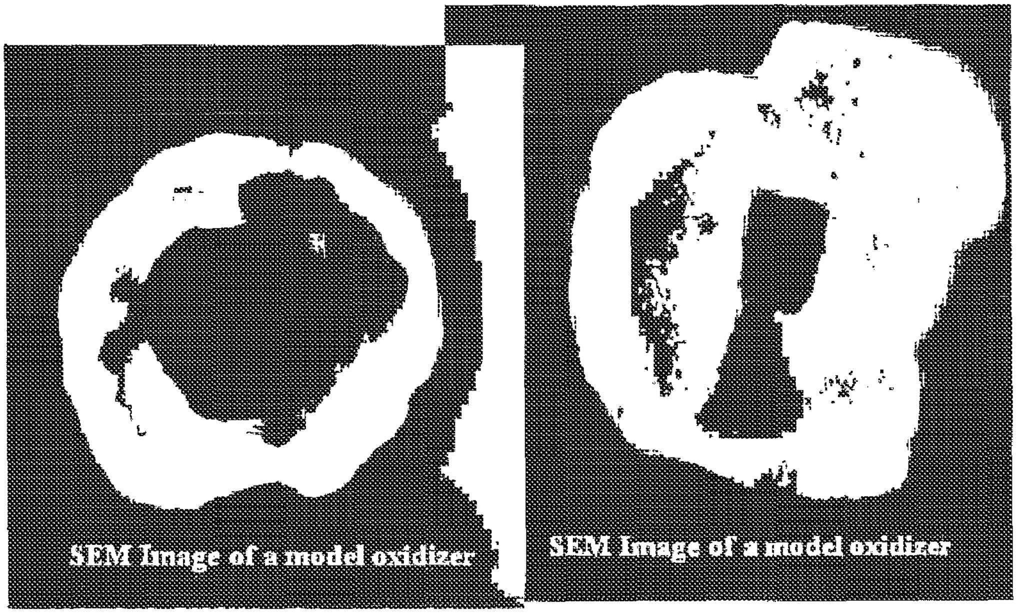
FIG. 7 shows single particle images extracted from the field of particle images.

With respect to particle morphology, FIGS. 5, 6 and 7 show examples of particles formed by the drying process using SEM images 42, 44, 46. These demonstrate the capability of drying processes to generate desired morphologies, in this example larger round shapes 48 with holes and some smaller round shapes 50 with some holes.

For superior drug delivery applications, one can manipulate the aerodynamic diameter by varying the porosity of dried material. The aerodynamic diameter $d_{aer}$ is by definition:

$$d_{aer}=(\rho)^{0.5}d$$

where ρ is the particle density and d is the geometric diameter of the particle. By achieving a highly porous structure, one can obtain low aerodynamic diameters even at larger particle scales. In addition, there is a great interest now in industrial use of "nano-porous media" such as catalysis, fuel cells, membranes, filtration, just to mention a few.

Figure 8:
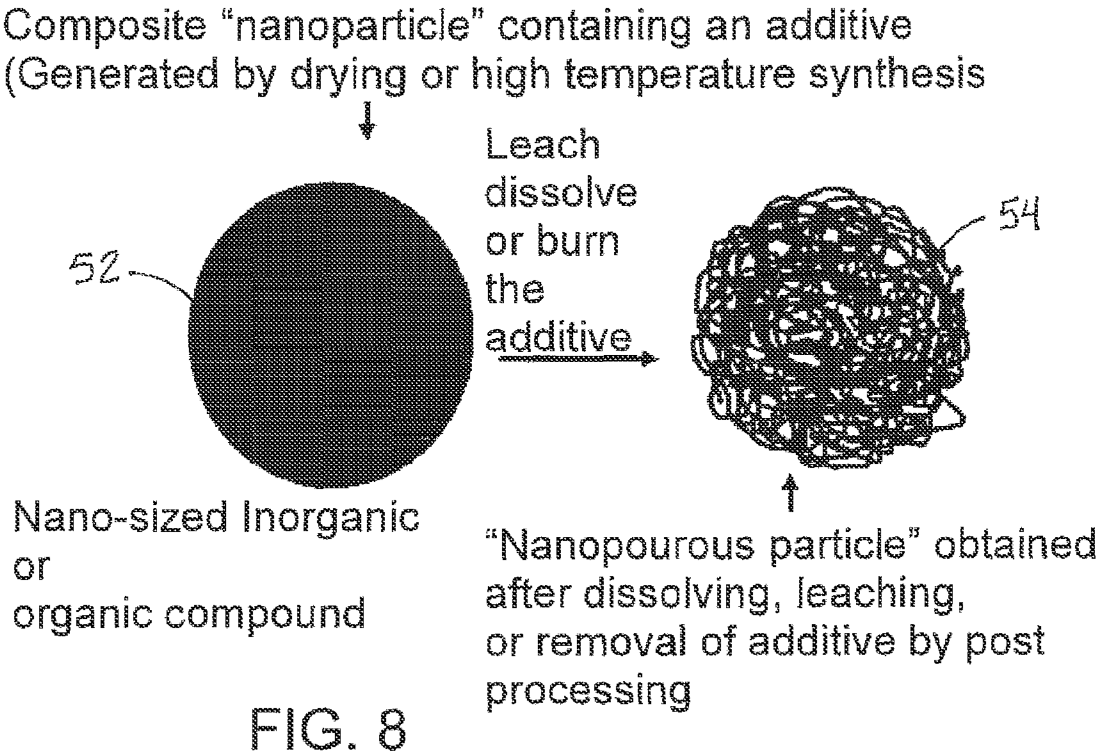
FIG. 8 shows a schematic view of a method of production of nanoporous material or nanoporous particles.

With respect to production of nano-porous material, FIG. 8 shows a schematic description of production of nano-porous materials by this invention. A method is provided to develop nano-porous materials using the concept of adding an additive while forming nano-particles. The additive is post-processed to remove the additive from the particle with additive 52. The resultant structure provides "nano-porous" material or nano-particle 54 with nano-porous structure. The nano prefix means that the resulting structures could be controlled by the processes provided herein to be on the scale of 10 micron or less in cross-sectional diameter.

In a first example, a model inorganic compound, such as sodium chloride, may be provided at a 9% wt portion of the precursor solution may be mixed with a 1% wt portion of an organic compound that dissolves in alcohol. The mixture is atomized to mono-disperse droplets of 1 micron diameter mist. Upon drying, the final particles will be approximately 100 nm assuming droplets do not coalesce and/or particles do not agglomerate. The final particle will be a composite of NaCl and a small proportion of organic compound. The 100 nm particles are now leached in an organic solvent to remove the organic part. Alternatively, the particles may be burnt to remove organic parts. The resultant particles are about 100 nm with nano-porous structure left behind by the organic part. The exact structure will depend on several factors including the amount of additive, the nature of the additive, drying conditions (Peclet number, Pe), and temperature.

In a second example, an organic compound is co-dissolved along with a small amount of inorganic additive such as sodium chloride. Upon atomizing a 10% by weight solution of approximately 1 micron droplets and drying, the final particles will be about 100 nm. The product particles are washed with water to remove NaCl by leaching. The final product are nano-scale particles with a porous structure.

The important aspect of this methodology is finding the right common solvent or a micro-emulsion composition to co-dissolve the additive that imparts nano-porous structure upon leaching and removing.

The dryer provided herein uses the most economical and well-recognized drying medium for micro and nano-material generation. The drying medium dries a well-mixed in-feed raw material, referred to herein as a precursor or precursor mist, comprised of sub-micron or micron-scale droplets. The precursor preparations can comprise materials that are desired for generation in micro and nano-scale particles. The precursor material may vary and may be formed by dissolving material in a solvent or forming a micro-emulsion medium or forming a slurry. Dissolved materials are dissolved in water or organic solvent depending on the solubility of the material or a mixture or appropriate solvents. The precursor is introduced into the dryer and controlled by parameters such as momentum and inlet direction and dryer mechanical structure to provide the precursor with a helical flow structure within the drying chamber or tube. Once mixed, the stream of drying medium and precursor mist swirls inside the tube in a helical formation as well.

In the method and apparatus provided, the nozzle-free low momentum atomization provides a means to deliver the precursor as a pseudo gas, without coalescence and agglomeration of droplets, so that the precursor pseudo gas can swirl around the heat source in a controlled manner. The dryer gas source or medium mixes with the precursor mist before the dryer gas reaches the main dryer section of the dryer body. The dyer gas can be pre-heated air, inert gas or steam. The use of heated air is optimally less than 300° C.

The precursor low momentum and fine-scale mist swirls around along the inner-wall of the reactor, but does not stick to the side because the vaporization gases rapidly coming out of heated droplets during the quick drying process create a gas layer in between the wall and the droplets. This cushions the particles, or, in other words, provides a physical barrier, in accordance with the "Leidenfrost" phenomenon. Further, the high velocity of the swirling gas moves droplets of the precursor away from surface of the wall.

An outlet is provided on the dryer that may connect to a variety of improvement devices or accessories for further processing of the generated particles, such as a cyclone separator, bag filters, or electrostatic filters. Further, the outlet may provide a dispersion medium for application of the particles, or the outlet could direct the particles to further processing sequences involved in the manufacture of the desired end product. Any suitable method of collection and application from the outlet may be employed and benefit from the advantages described.

The dryer gas may comprise preheated dryer gas or steam. Nonetheless, the dryer gas is heated. As taught herein, the dryer tubes can be heated to a desired temperature by means of catalytic screens. Also, electrical heat sources, direct or indirect combustion contained within the core may be used. Alternatively, the dryer core can be heated to a desired temperature by means of catalytic screens, electrical heat sources, or direct or indirect combustion contained within the core. The elements of the preheated dryer gas the heated dryer tube, and the heater dryer core may be combined.

The dryer reactor as shown is oriented and configured according to need. The reactor may be oriented horizontally, making it easy to work with. The reactor may be oriented vertically, assisting free convection. Or, the reactor may be oriented with angles that help in collecting samples.

Mist parameters are controlled through the ambient atomization thereof such that the atomized precursor droplets are preferably less that 5-10 micron in diameters, providing stable droplets that do not drop out easily. The nozzle-free atomization may also be controlled to provide a narrow distribution of size precursor droplets, even in the submicron range. The momentum or velocity of the mist is controlled for very low momentum fluid suitable to use in tangential inlets. The concentration of precursor in the solution is varied for the parameters of the dryer and character of particles to be formed.

Precursor materials and composition that may be desired and used include without limitation any salts where one can find a solvent or slurry, chemicals that can form in-situ in the atomizer assembly, mixtures of compounds, a mixture of precursors from more than one misting source combined, As discussed herein, residence time of the precursor mist may be controlled by varying mist inlet velocity, varying swirl number, varying tube diameter, varying inlet location axially, varying tube length, and by varying the number of helix tubes.

Also, by a suitable choice of heat source, the dryer can be used for drying and synthesizing heat sensitive materials and explosives, pharmaceuticals products for nano-particle formation, any compound in which a change in chemical composition from exposure to excessive temperature is undesirable, any compound in which a change in chemical composition from exposure to a specific temperature is desired.

Nano-porous materials may be produced for use with respect to pharmaceuticals, explosives and propellant ingredients (ammonium percholorate, ammonium nitrate, organic explosives such as HMX, RDX, TNT), and a wide variety of other nano-porous materials.

What is claimed is:

1. A method for manufacturing extremely fine particles and porous materials by controlled low temperature drying comprising the steps of: (a) forming a precursor mist by atomizing a particle precursor solution by an ambient-pressure and ambient-temperature atomizer; (b) mixing the precursor mist with a drying gas into a reactant stream; (c) introducing the stream into a dryer tube through a swirl generating inlet; and (d) moving the reactant stream through the dryer tube in a helical flow.

* * * * *